Sept. 7, 1965

R. L. PHILLIPS ETAL 3,204,716

STAIR CLIMBING VEHICLE

Filed Oct. 26, 1962

INVENTORS
Robert L. Phillips &
Harley L. Sheets

BY
Mason, Fenwick & Lawrence
ATTORNEYS

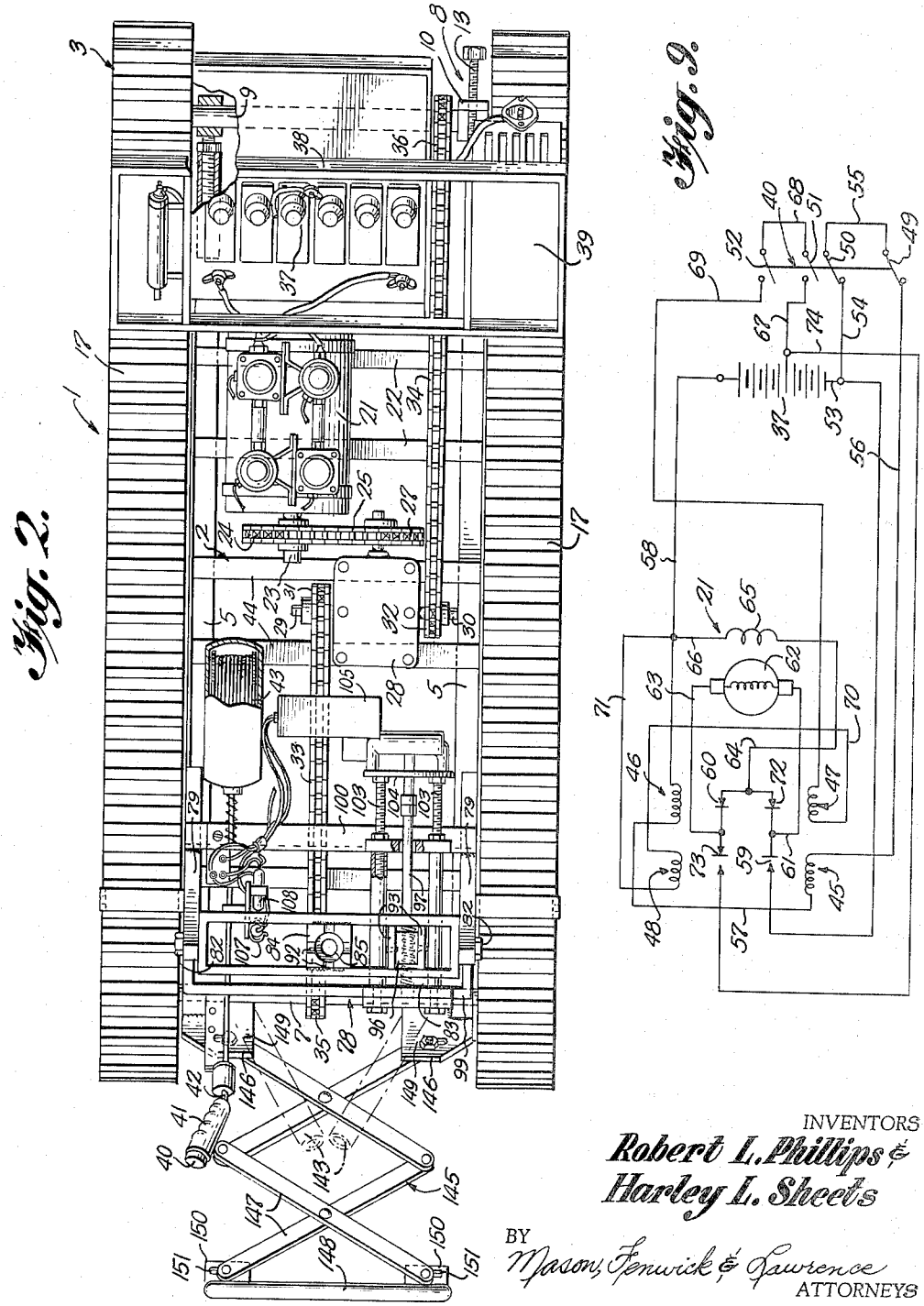

Sept. 7, 1965
R. L. PHILLIPS ETAL
3,204,716
STAIR CLIMBING VEHICLE
Filed Oct. 26, 1962
5 Sheets-Sheet 3
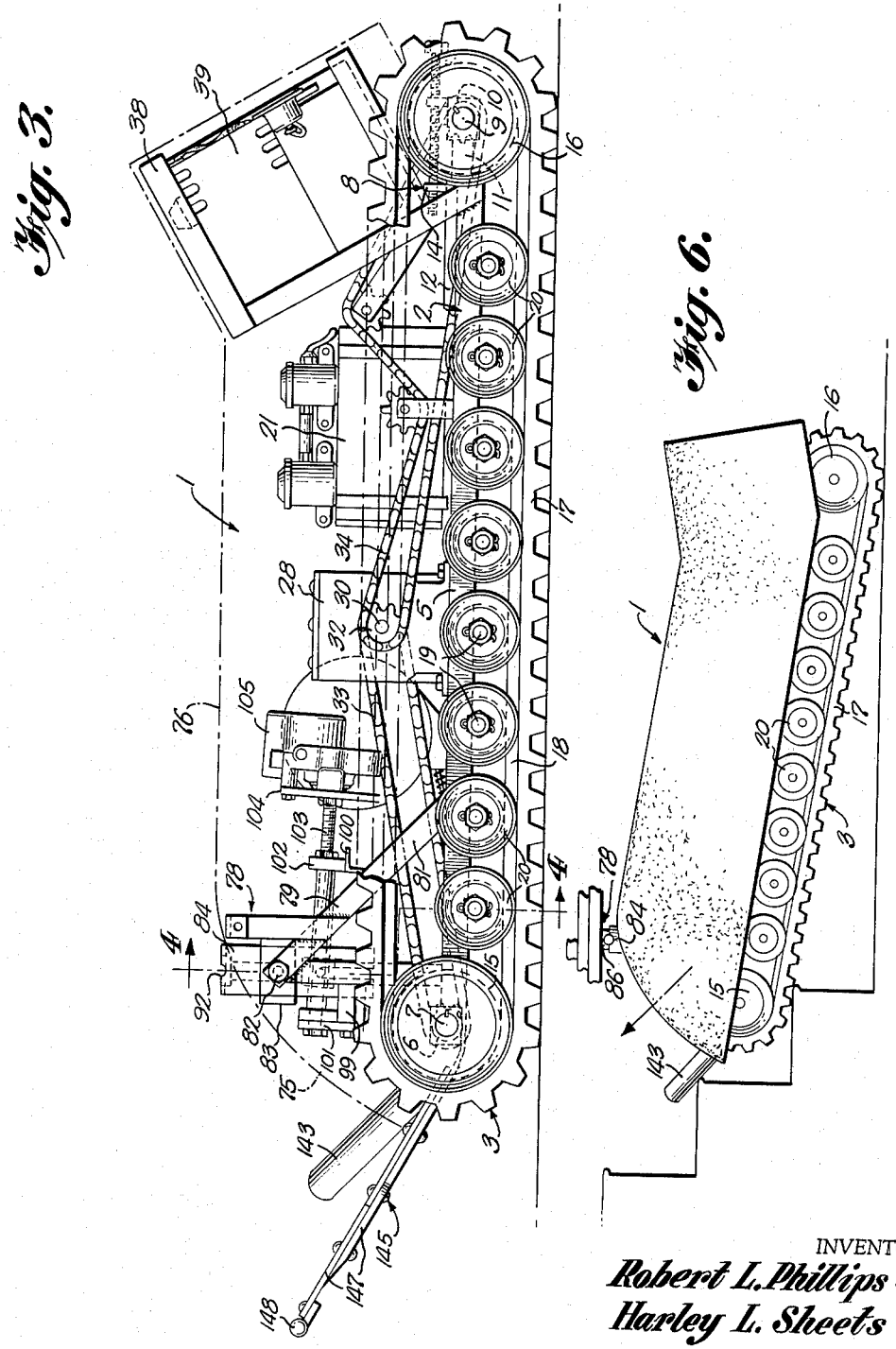
INVENTORS
Robert L. Phillips &
Harley L. Sheets
BY Mason, Fenwick & Lawrence
ATTORNEYS

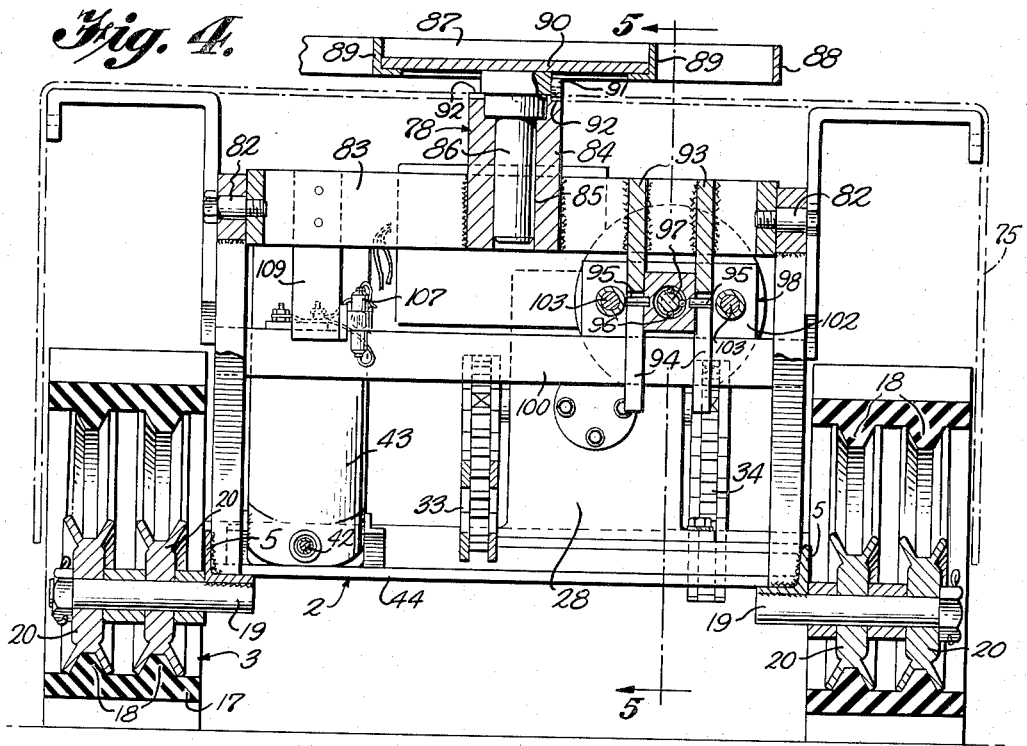

INVENTORS
Robert L. Phillips &
Harley L. Sheets
BY Mason, Fenwick & Lawrence
ATTORNEYS

United States Patent Office 3,204,716
Patented Sept. 7, 1965

3,204,716
STAIR CLIMBING VEHICLE
Robert L. Phillips, Box 107, and Harley L. Sheets,
417 Hess St., both of Morgantown, W. Va.
Filed Oct. 26, 1962, Ser. No. 233,485
8 Claims. (Cl. 180—9.22)

This invention relates to devices for transporting persons or goods, and is particularly adapted for movement on stairs, to facilitate moving invalids, or semi-invalids, from one floor to another in buildings, on and off planes, etc.

For some time rail, or track, mounted chairs for carrying persons up and down stairs have been in use. These are power operated and have proven very satisfactory. They have certain drawbacks, however; they are quite expensive and are permanent installations which materially reduce the stair space available for normal traffic. Recently, various proposals have been made to provide vehicles which are capable of transporting persons along level ways and which are able also to climb over obstructions and up and down stairs. While these eliminated the need for rails, or tracks, they have been somewhat awkward in operation and, for one reason or another, have not proven acceptable.

The general object of the present invention is to provide an improved and highly practical transporting device which will travel over level ground and up and down stairways with complete safety.

A more specific object is the provision of a stair climbing vehicle which secures its traction by simultaneous frictional contact with the tread edges of several steps, and moves freely up and down the steps under its own power.

Another object of the invention is to provide a self-propelled vehicle which can be controlled either by the occupant or by an attendant.

A further object is the provision of a stair climbing vehicle having a passenger seat which is automatically adjustable to maintain the seat level irrespective of the attitude of the vehicle.

It is also an object to have a vehicle of this kind wherein the occupant's seat is removable and can be used as a separate wheel chair.

Still another object of the invention is to provide a stair climbing vehicle having means to automatically increase the motive power for stair ascending over that provided for stair descending.

Yet a further object is the provision of means to initiate a lifting movement of the leading end of the vehicle upon reaching a stairway to facilitate the vehicle attaining its proper climbing attitude.

Other objects of the invention will become apparent from the following description of one practical embodiment thereof, when taken in conjunction with the drawings which accompany, and form part of, this specification.

In the drawings:

FIGURE 2 is a top plan view of the vehicle with the seat and chassis cover removed to show the frame and operating mechanism;

FIGURE 3 is a side elevation of the structure shown in FIGURE 2, the chassis cover being indicated by dotted lines;

FIGURE 4 is a vertical transverse section taken on the line 4—4 of FIGURE 3, the parts being shown on an enlarged scale;

FIGURE 5 is a fragmentary vertical longitudinal section taken on the line 5—5 of FIGURE 4, showing in detail the seat leveling mechanism;

FIGURE 6 is a somewhat diagrammatic view illustrating the vehicle as it starts to lift to climb stairs;

FIGURE 9 is a diagram of the electrical circuit used to control and operate the vehicle.

Figure 1:
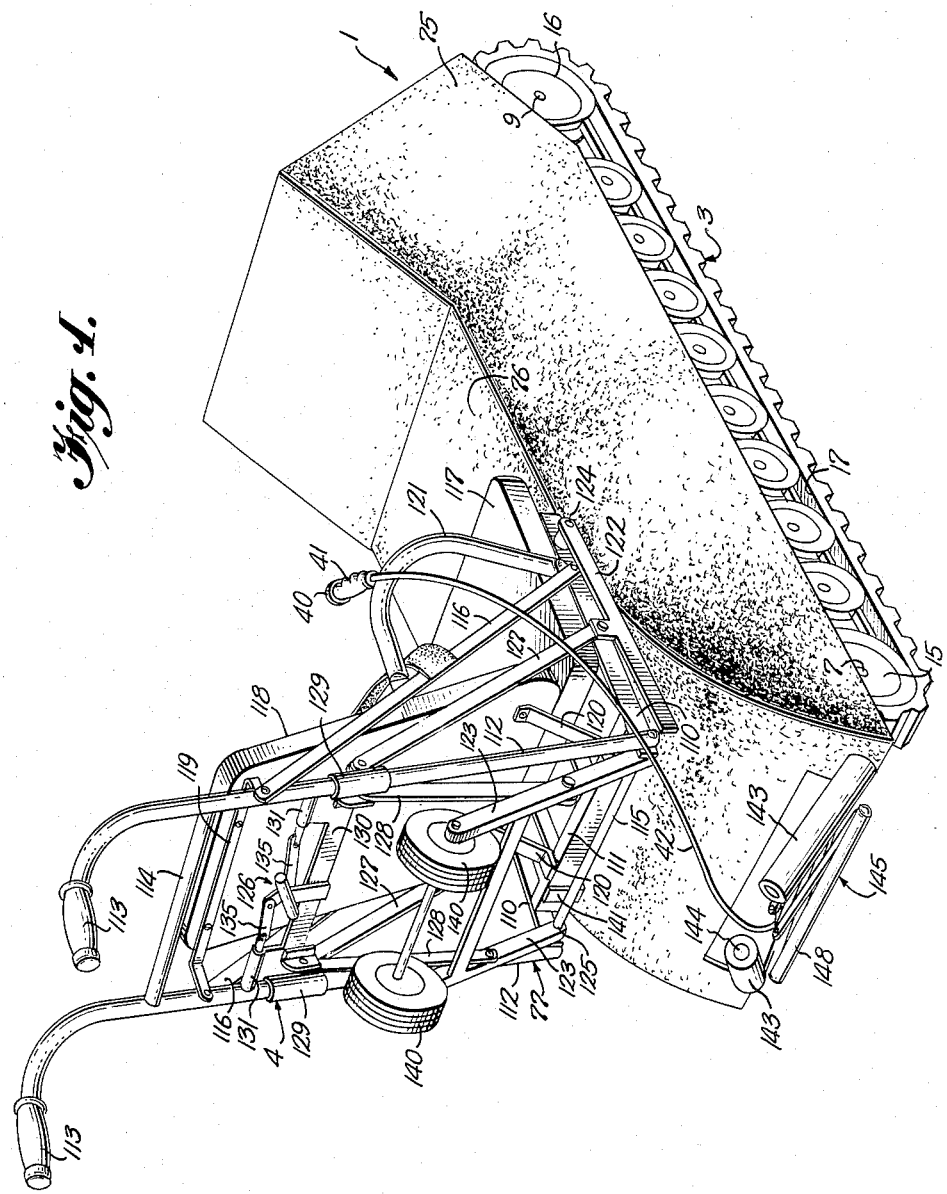
FIGURE 1 is a perspective view of a transporting vehicle embodying the principles of the present invention.

In general, the invention contemplates the provision of an endless tread vehicle carrying a passenger chair, or seat, or a cargo deck, and capable of moving up or down stairs by contact with the tread edges of the steps. The vehicle is self-propelled, and under the control of the passenger or of an attendant. The seat is removable from the vehicle for use as a separate transporting means and when on the vehicle maintains a level position regardless of the attitude of the vehicle.

Referring to the drawings in detail, there is shown a transporting vehicle 1 which includes a main frame 2 supported upon endless tracks 3 and carrying a passenger seat 4. Although a seat for a single passenger has been shown, accommodation for more than one person may be provided if desired.

The vehicle frame 2 is formed by a pair of spaced, parallel side rails 5 which carry bearings 6 at one end to receive an axle 7. At the opposite end, the frame rails carry track tightening mechanism 8 which supports an axle 9. This may take the form of axle supports 10 fixed to rods 11, slidably received in sleeves 12 fixed to the frame rails. Adjusting screws 13, threaded through lugs 14 on the rails, are connected to the supports 10 to move them relative to the rail ends to shift the axle 9.

Axles 7 and 9 carry drive wheels 15 and 16, respectively, about which endless tracks 17 are trained. The wheels are in the form of double groove pulleys, and the tracks have spaced ribs 18 on their undersides to ride in the pulley grooves and hold the tracks against lateral shifting relative to the wheels. The use of double pulleys provides for greater frictional drive between the wheels and tracks, and permits the use of wider treads to ensure better traction on the stairs. It is highly important that the bottom flights of the endless tracks be held substantially straight without deflection from one wheel to the other. To this end, a plurality of axles 19 are fixed to the undersides of the rails 5 and carry freely rotatable guide wheels 20. These are arranged so that their lower peripheries and the lower peripheries of the wheels 15 and 16 are tangent to a common plane. This will provide spaced contacts longitudinally of the bottom flights of the track to support the bottom track flights for straight line movement.

The two axles are driven by means of a reversible motor 21 mounted upon straps 22 extending between the rails 5. The motor shaft 23 carries a sprocket 24, connected by means of a chain 25 to a sprocket 26 on the input shaft 27 of a speed reducer 28. Output shafts 29 and 30 carry sprockets 31 and 32, respectively. Chains 33 and 34 connect sprockets 31 and 32 with sprockets 35 and 36 on axles 7 and 9. Thus, operation of the motor will cause rotation of both axles to set in motion the tracks 16 to cause the vehicle to move. By driving both axles, the tracks will have an equalized movement irrespective of the surface over which the vehicle is moving, and there can be no track stretch as both wheels are moving at the same rate.

The motor 21 is electric and is operated by current from a storage battery 37 mounted in an auxiliary frame 38, carried by the main frame side rails 5. A charger 39 is also mounted in the frame 38 and can be connected to a convenient electric outlet to charge battery 37 in place.

The motor is controlled by means of a switch 40 mounted in the end of a hand grip 41. The hand grip is at the end of an electric cable 42 wound upon a spring drum 43 attached to one of the frame cross-straps 44 which also support the speed reducer 28. The cable can be unreeled as desired to allow the hand grip to be held by an occupant of seat 4, or by an attendant, so that switch 40 can be manipulated to control the vehicle.

Referring to FIGURE 9, it will be seen that motor 21 is connected to the battery 40 so as to get the benefit of the full twelve volt power of the battery at times, and at other times to use only six volts. By having the motor connected so that it is in circuit with the six volt terminal when running in one direction, and with the twelve volt terminal when running in the opposite direction, it is possible to utilize the greater power for stair climbing and the lesser voltage for descending stairs.

The circuit illustrated includes switch 40, battery 37, motor 21 and four coil operated switches 45, 46, 47 and 48. These latter switches may be relays or solenoid operated. Switch 40 is schematically shown as a gang switch having four contacts 49, 50, 51 and 52. This switch will have three positions, which include an intermediate off position in which all contacts are open, an operative position in which contacts 49 and 50 are closed and contacts 51 and 52 are open, and a second operative position in which contacts 49 and 50 are open and contacts 51 and 52 are closed.

Where it is desired to climb stairs, or to move in a stair climbing direction, switch 40 is moved to the position shown in FIGURE 9, wherein the contacts 49 and 50 are closed. This will complete a control circuit from the twelve volt terminal of the battery to close a circuit to the motor. This circuit will include wire 53 from the twelve volt terminal of battery 37, wire 54, contact 50 of switch 40, wire 55, contact 49 of switch 40, wire 56 to the coil of switch 45, wire 57 to the coil of switch 46 and wire 58 to the opposite side of the battery. Energizing the coils of switches 45 and 46 will close the contacts 59 and 60 of these switches and complete a circuit from the twelve volt terminal of the battery through the motor. This circuit includes line 53 from the twelve volt terminal to contact 59, wire 61 to the armature 62 of motor 21, wire 63, contact 60 of switch 46, wire 64 to motor field windings 65, wire 66 and wire 58 to the opposite side of the battery. This will start the motor and begin movement of the vehicle.

When it is desired to descend stairs, or move the vehicle in a stair descending direction, switch 40 is moved to the other operative position wherein contacts 49 and 50 are open and contacts 51 and 52 are closed. This will close a control circuit from the six volt terminal of the battery, which includes wire 67, contact 51, wire 68, contact 52, wire 69 to the coil of switch 47, wire 70 to the coil of switch 48, and wires 71 and 58 to the opposite side of the battery. This will close the contacts 72 and 73 of switches 47 and 48, and complete a circuit from the six volt terminal through wire 74, switch contact 73, wire 63, in a reverse direction through motor armature 62, wire 61, switch contact 72, wire 64, motor field coil 65, and wires 66 and 58 to the opposite side of the battery.

With the electrical arrangement just described, it is possible to run the vehicle in either direction. In one direction full twelve volt power is used, and in the other only six volt power is used.

The chassis, just described, which includes the frame, endless tracks, and power unit, is housed by a suitable cover 75 that forms a body for the vehicle. The top of the cover may be appropriately contoured to form a floor, or foot rest, 76 for a passenger occupying the seat 4.

The seat includes a chair proper 77, which is removable from the vehicle for independent use, as will be described, and a chair support 78, which is a permanent part of the vehicle and includes an automatic leveling means to maintain the chair in a predetermined position relative to the horizontal regardless of the angle of the vehicle chassis.

The support is mounted on the vehicle frame upon an inverted V-shaped upright 79 rising from the frame side rails 5. The uprights include vertical legs 80 and inclined legs 81 welded together at their top ends. The uprights are apertured near their tops and carry pivot pins 82. These pins tiltably support a rectangular yoke 83. The yoke carries a socket member 84 at its center, which has a vertically extending socket 85 to receive the mounting stud 86 of a chair supporting platform 87. Platform 87 is of skeleton form, having a perimetral frame 88, suitably cross-braced, as at 89. A plate 90 is fixed to the center bracing members and carries the mounting stud 86. Stud 86 has a locating wheel 91 attached to its side adapted to seat in notches 92 in the top of the socket member 84. The notches are at ninety degree spacings around the socket member top so that the platform may have four positions of orientation. Wheel 91 will ride on the top surface of socket member 84 in moving from one notch to another.

Control arms 93 depend from yoke 83 and provide means for tilting the yoke about its pivots 82, and consequently cause tilting movement of the chair support. The arms are slotted, as at 94, to receive pins 95 projecting from the sides of a nut 96 which is threaded on a screw 97. The screw is held against longitudinal movement relative to a mounting frame 98, so that rotation of the screw will cause the nut to move along the screw, swinging arms 93 and tilting yoke 83. Frame 98 has foundation members 99 and 100 extending across the vehicle and attached to the legs of the upright 79. These members carry vertical plates 101 and 102, through which mounting bolts 103 and screw 97 extend. Bolts 103 project beyond plate 102 to a mounting plate 104 supporting a leveling motor 105. Motor 105 has a worm wheel 106 which is mounted on the end of screw shaft 97. Whenever motor 105 is energized, screw 97 will rotate and nut 96 will be moved longitudinally of the screw.

Motor 105 is controlled by a pair of mercury switches 107 and 108 carried by a plate 109 suspended from the yoke 83. The switches will be connected to the battery and motor 105 to start and stop the motor as the seat platform leaves and reaches horizontal position. The motor, of course, will be reversely operated in moving the platform to and from a position parallel with the vehicle frame.

The chair proper has a rigid frame which includes a seat frame, having side members 110 interconnected by cross members 111, and a back frame, having rails 112 terminating at the top in handles 113 connected by cross rods 114 and 115. Braces 116 secured to seat frame side members 110 and the back frame rails 112, hold the frame sections in fixed relation. A padded seat 117 is fixed to the seat frame, and a back 118 is connected by brackets 119 and 120 to the back frame and seat frame, respectively. Arms 121 may be attached to the seat frame and braces 116. This much of the chair is a rigid structure.

Figure 7:
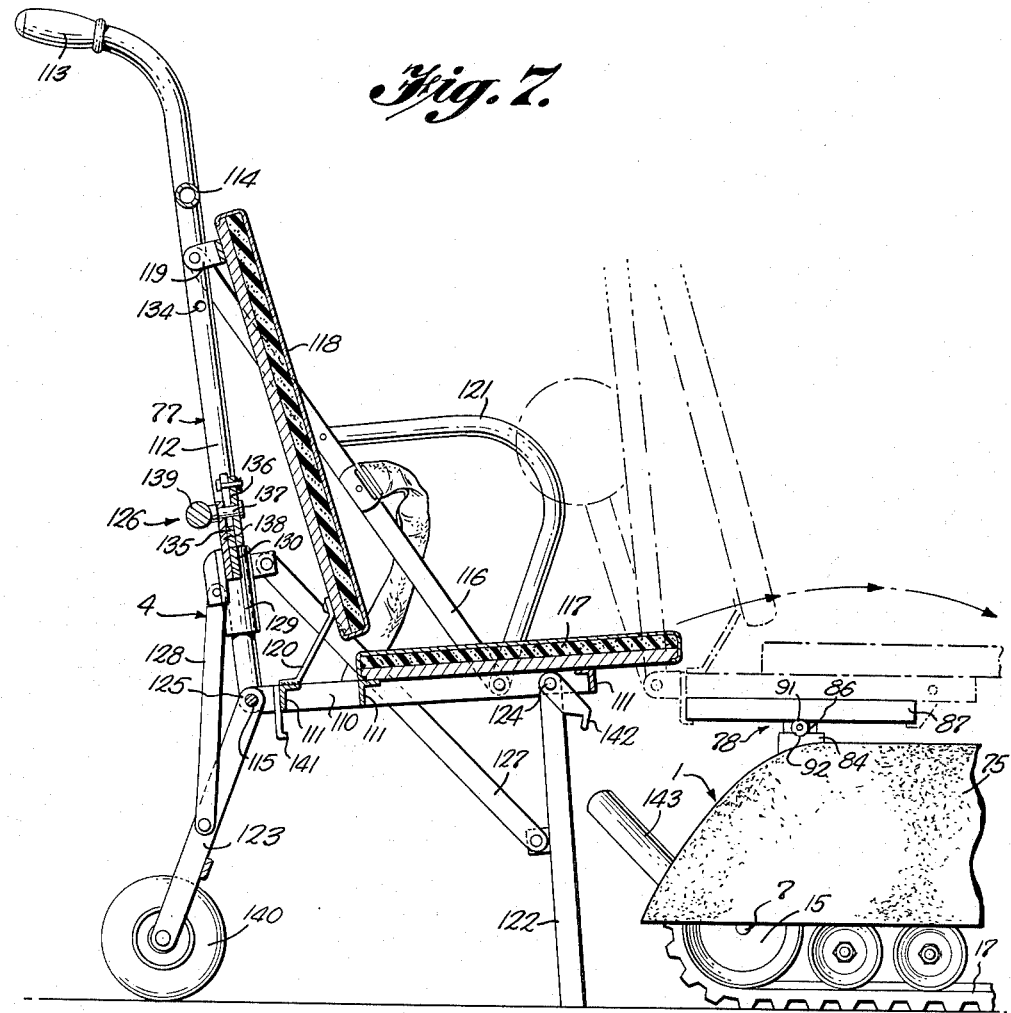
FIGURE 7 is a vertical section through the seat removed from the vehicle and set up as a wheel chair, the adjacent end of the vehicle being shown in side elevation.
Figure 8:
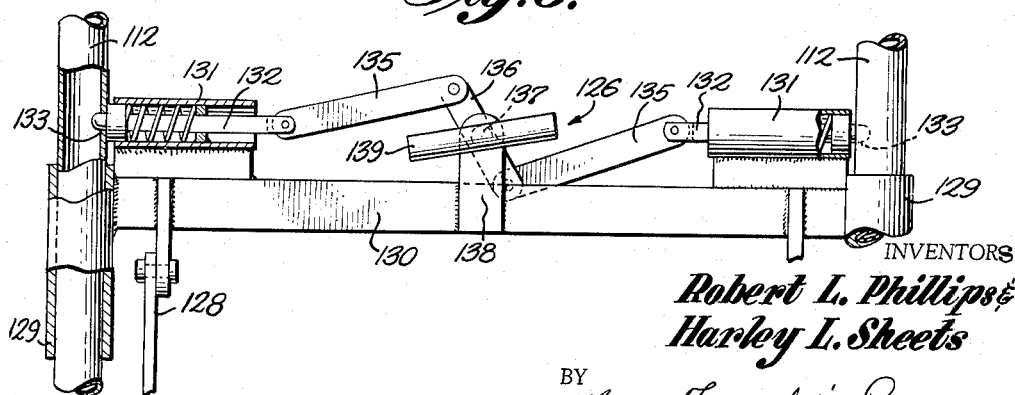
FIGURE 8 is a detail view of a portion of the seat frame showing the means for locking the seat in its various positions.

The chair has legs 122 and 123 which are movable to positions to support the rigid structure above the floor, or ground, when the chair is removed from the vehicle as shown in FIGURE 7, and retracted when the chair is in place on the vehicle, as shown in FIGURE 1. To accomplish this, legs 122 are pivotally attached to the seat frame side members 110, as at 124, and legs 123 are pivotally connected to the chair at the juncture of the seat and back frames, as at 125. Both sets of legs are connected to a locking carriage 126 which is slidably mounted on the back frame rails 112. Legs 122 are connected to carriage 126 by links 127, and legs 123 by links 128. The several links are pivotally connected to the respective legs and to the carriage.

Locking carriage 126 consists of tubular guides 129, which are slidable on the side rails 112, and are joined by a connecting bar 130. The bar carries a horizontally positioned sleeve 131 at each end, with spring pressed locking pins 132 in the sleeves. The pins are adapted to enter holes 133 in the side rails to lock the carriage in position to hold the legs in extended, operative position, as in FIGURE 7, or holes 134 at a higher level to lock the carriage in position to hold the legs in retracted position, as in FIGURE 1. Locking pins 132 are spring urged into locking position, and are withdrawn from locking position by means of links 135 which are pivotally connected to the pins and to opposite ends of an operating arm 136. Arm 136 is connected at its middle to a pivot shaft 137 which passes through an ear 138 on the bar 130 and has a handle 139 fixed to its opposite end. Turning handle 139 will rock arm 136 and withdraw the locking pins. When the legs have been extended, the pins 132 can be withdrawn and the carriage moved upwardly along the rails 112 until the pins drop into holes 134. This movement of the carriage will draw up links 127 and 128 and swing legs 122 to positions parallel to the seat frame and legs 123 to positions adjacent the back frame.

Legs 123 may be provided with wheels 140 so that the chair may be tilted to raise legs 122 from the floor and be rolled from place to place. Of course, all legs could be so equipped, if desired.

The spacing between opposite legs 122 and opposite legs 123 will be sufficient so that the legs will straddle the vehicle. This will permit the chair to be rolled into place with the chair seat frame resting upon the chair supporting platform 87. As the chair is moved into position, hooks 141, carried by the trailing cross member 111 of the seat frame, will engage over the perimetral frame of the chair supporting platform. This limits the movement of the chair and fixes the position of the chair relative to the vehicle. Latches 142, carried on the pivot rods 124 of the legs 122, will then be engaged about the opposite side of the perimetral frame of the supporting platform to lock the chair to the platform. The chair will be fixed in place, but it may be rotated to either side with the platform to facilitate entering or leaving the chair.

In order to assist the endless tracks in raising the leading end of the vehicle when stairs are approached, converging, inclined rollers 143 may be mounted adjacent axle 6 to project beyond the tracks as they turn about drive wheels 15 to act as rotatable cams to provide a rolling lift for the end of the vehicle (see FIGURE 6). After the vehicle has assumed its full climbing inclination, the rollers will no longer contact the stairs. The rollers are mounted upon axles 144 which are fixed to the side rails 5 of the main frame.

Below the rollers 143, there is a collapsible handle 145 which may be extended to provide means for an attendant to control the vehicle direction, or otherwise keep contact with the vehicle, or collapsed to underlie rollers 143 but wholly within the arc of movement of the endless tracks about the wheels 15 so as not to be in the way of contact by the rollers 143 or the track with stairs, or an obstruction over which the vehicle must move. The handle is connected to brackets 146 secured to the side rails 5 of the main frame. The handle consists of a plurality of links 147 pivotally interconnected in the manner of the well known lazy tongs. A hand grip 148 bridges the ends of the outermost links. Brackets 146 have transverse slots 149 and brackets 150 on hand grip 148 have similar slots 151 to allow the side movement necessary to the pivots between the brackets and links to permit extension and collapsing of the handle.

In operating the vehicle, the passenger seats himself, or is seated, on the chair 77. The chair may be rotated to the side for easy access, if desired, and after the passenger is seated rotated back into alignment with the vehicle. The passenger's feet will rest upon the floor 76. If the passenger is to operate the vehicle, he will hold the hand piece 41 so that he can manipulate switch 40. If an attendant is to control the vehicle he will hold the hand piece. In either event, the cable 42 will unreel from drum 43 just enough to place the hand piece where desired without slack that might become entangled in the mechanism. If an attendant is to control the vehicle he will pull out handle 145 in order to guide the vehicle.

The vehicle is set in motion by operating switch 40. If the switch is turned to stair climbing position, contacts 49 and 50 will be closed and the vehicle motor will operate with full twelve volts power. The vehicle will move to the left as viewed in FIGURES 1, 3 and 6. If the handle is extended, it will have to be collapsed before the stairs are reached. As the vehicle approaches the stairs, rollers 143 will contact the first stair tread and supply a rolling cam surface to lift the leading end of the vehicle from the floor. Of course, as the endless tracks come into contact with the stair tread, a power grip is obtained to pull the vehicle up the steps. The leading end of the vehicle will continue to rise until the vehicle has assumed an angle equal to the angle of assent of the stairs. At this time, the endless track will be in contact with several steps, and this contact will be maintained during the entire climbing operation.

As the leading end of the vehicle begins to rise, the angle of tilt will cause the leveling switches to become operative to start the leveling motor 105 to cause the chair support to adjust to maintain the chair in a level condition. This movement will continue so long as the vehicle continues to tilt. When the vehicle has assumed its full climbing attitude, the leveling motor will be stopped and the chair will remain in a level position. This operation is fully automatic as the leveling switches tilt with the seat support and are in open condition only when the seat is level.

In descending stairs, the control switch 40 is operated to close contacts 51 and 52 to reverse the motor operation and to supply but six volts power to the motor. The descending movement will be quite slow and safe.

It will be obvious that the vehicle can be run over level floor, or ground, if desired. However, it may be desirable, when reaching the top of aircraft loading steps, for example, to remove the chair from the vehicle and move the passenger to his seat by pushing the chair along the aisle. The chair can be removed by releasing the latches 142, turning the handle 139 to release the locking carriage 126, moving the carriage downward to extend the chair legs and lock them in extended position, tilting the chair backward to balance the weight on the legs 123 which have their wheels 140 on the floor and moving the chair from the vehicle. The chair can be repositioned by a reversal of the operational steps just set out.

While in the above one practical embodiment of the invention has been disclosed, it will be evident that the details of construction shown and described are by way of example only, and the invention may take other forms within the scope of the appended claims.

What is claimed is:

1. A stair climbing vehicle comprising, a frame, axles carrying drive wheels journalled at opposite ends of the frame, endless tracks about the wheels, reversible means mounted on the frame to drive the wheels to advance the tracks, guide means mounted on the frame intermediate the drive wheels supporting the bottom flights of the tracks to hold the bottom flights in the planes of their longitudinal movement throughout their lengths, a seat supported from the frame, a mount for the seat which includes automatic means to maintain the seat in a horizontal position irrespective of longitudinal tilting of the vehicle frame, and the seat being mounted for rotation in a horizontal plane.

2. A stair climbing vehicle comprising, a frame, axles carrying drive wheels journalled at opposite ends of the frame, endless tracks about the wheels, reversible means mounted on the frame to drive the wheels to advance the tracks, guide means mounted on the frame intermediate the drive wheels supporting the bottom flights of the tracks to hold the bottom flights in the planes of their longitudinal movement throughout their lengths, a seat supported from the frame, a mount for the seat which includes automatic means to maintain the seat in a horizontal position irrespective of longitudinal tilting of the vehicle frame, the seat being mounted for rotation in a horizontal plane upon a support, and means to releasably attach the seat to the support.

3. A stair climbing vehicle comprising, a frame, axles carrying drive wheels journalled at opposite ends of the frame, endless tracks about the wheels, reversible means mounted on the frame to drive the wheels to advance the tracks, guide means mounted on the frame intermediate the drive wheels supporting the bottom flights of the tracks to hold the bottom flights in the planes of their longitudinal movement throughout their lengths, a seat supported from the frame, a mount for the seat which includes automatic means to maintain the seat in a horizontal position irrespective of longitudinal tilting of the vehicle frame, a control member for the reversible drive means carried at the end of a cable, a drum for the cable, and automatic means to wind the cable on the drum.

4. A stair climbing vehicle comprising, a frame, axles carrying drive wheels journalled at opposite ends of the frame, endless tracks about the wheels, reversible means mounted on the frame to drive the wheels to advance the tracks, guide means mounted on the frame intermediate the drive wheels supporting the bottom flights of the tracks to hold the bottom flights in the planes of their longitudinal movement throughout their lengths, a seat supported from the frame, a mount for the seat which includes automatic means to maintain the seat in a horizontal position irrespective of longitudinal tilting of the vehicle frame, and freely rotatable rollers mounted at one end of the frame, the rollers inclining from the frame end and converging, the rollers projecting beyond the endless tracks in the region where the tracks move around the drive wheels at the frame end to which the rollers are connected to provide rolling cam surfaces to contact stairs and form primary lifting means for the end of the vehicle to which the rollers are connected.

5. A stair climbing vehicle comprising, a frame, axles carrying drive wheels journalled at opposite ends of the frame, endless tracks about the wheels, reversible means mounted on the frame to drive the wheels to advance the tracks, guide means mounted on the frame intermediate the drive wheels supporting the bottom flights of the tracks to hold the bottom flights in the planes of their longitudinal movement throughout their lengths, a seat supported from the frame, a mount for the seat which includes automatic means to maintain the seat in a horizontal position irrespective of longitudinal tilting of the vehicle frame, and a handle connected to one end of the frame to permit an attendant to lift and turn the vehicle, the handle being collapsible and when collapsed lying wholly inside the path of travel of the endless tracks.

6. A stair climbing vehicle comprising, a frame, traction means capable of simultaneous contact with the tread edges of a plurality of steps mounted on the frame, reversible means to drive the traction means mounted on the frame, means carried by the frame forming a chair supporting platform, a chair releasably connected to the platform, the means forming a chair supporting platform including a support pivotally mounted for tilting movement about an axis transverse to the vehicle, and means responsive to longitudinal tilting movement of the vehicle to tilt the support about its axis to maintain the chair in a level position, the means to tilt the support including a feed screw, means to rotate the feed screw, a nut for movement longitudinally of the screw carried by the support, and means operative upon movement of the chair from a level position to actuate the feed screw rotating means.

7. A stair climbing vehicle comprising, a frame, traction means capable of simultaneous contact with the tread edges of a plurality of steps mounted on the frame, reversible means to drive the traction means mounted on the frame, means carried by the frame forming a chair supporting platform, and a chair releasably connected to the platform, the chair including a seat and back and having supporting legs, wheels on at least some of the legs, the legs being pivotally connected to the chair for movement to positions below the seat for supporting the chair and raised to at least seat level, and means to lock the legs in each position.

8. A stair climbing vehicle comprising, a frame, traction means capable of simultaneous contact with the tread edges of a plurality of steps mounted on the frame, reversible means to drive the traction means mounted on the frame, means carried by the frame forming a chair supporting platform, and a chair releasably connected to the platform, the chair supporting platform being rotatable about a vertical axis to allow the chair to move to various positions of orientation relative to the vehicle, and means to releasably hold the chair supporting platform at selected positions of rotational movement.

References Cited by the Examiner

UNITED STATES PATENTS

| 301,662 | 7/84 | Bliss | 280—47.37 X |
|---|---|---|---|
| 2,124,708 | 7/38 | Peter | 180—9.62 |
| 2,500,589 | 3/50 | Wuerthner | 280—47.24 |
| 2,572,910 | 10/51 | Brown | 280—6.1 |
| 2,592,023 | 4/52 | Gleason. | |
| 2,708,977 | 5/55 | Scheppe | 191—12.2 X |
| 2,751,027 | 6/56 | McLaughlin. | |
| 2,931,449 | 4/60 | King. | |
| 3,068,950 | 12/62 | Davidson | 180—9.24 |

FOREIGN PATENTS

| 808,411 | 7/51 | Germany. |
|---|---|---|

ARTHUR L. LA POINT, *Primary Examiner.*